(12) United States Patent
Shetley et al.

(10) Patent No.: US 6,758,194 B2
(45) Date of Patent: Jul. 6, 2004

(54) PARALLEL VAPORIZED FUEL SYSTEM

(75) Inventors: Michael Shetley, Okeechobee, FL (US); Sydney Cooke, Ft. Pierce, FL (US)

(73) Assignee: Emission Controls Corporation, Ft. Pierce, FL (US)

( * ) Notice: Subject to any disclaimer, the term of this patent is extended or adjusted under 35 U.S.C. 154(b) by 0 days.

(21) Appl. No.: 10/293,316

(22) Filed: Nov. 12, 2002

(65) Prior Publication Data

US 2004/0089277 A1 May 13, 2004

(51) Int. Cl.[7] .............................................. F02M 33/02
(52) U.S. Cl. ....................... 123/557; 123/525; 123/538; 123/568.11; 123/549
(58) Field of Search ......................... 123/525, 543–557, 123/536–538, 568.11

(56) References Cited

U.S. PATENT DOCUMENTS

| | | | |
|---|---|---|---|
| 4,151,821 A | | 5/1979 | Wichman et al. |
| 4,161,931 A | | 7/1979 | Giardini et al. |
| 4,512,323 A | * | 4/1985 | Ruth et al. ................... 123/557 |
| 4,538,583 A | | 9/1985 | Earl |
| 4,550,706 A | | 11/1985 | Hoffman |
| 4,606,319 A | | 8/1986 | Silva |
| 4,622,944 A | | 11/1986 | Earl |
| 4,665,879 A | | 5/1987 | Earl |
| 4,781,165 A | * | 11/1988 | Rawlings .................... 123/555 |
| 4,926,831 A | | 5/1990 | Earl |
| 5,019,120 A | * | 5/1991 | Lewis et al. ................. 123/557 |
| 5,048,501 A | * | 9/1991 | Smith et al. ................. 123/554 |
| 5,349,934 A | * | 9/1994 | Miyano ....................... 123/525 |
| 5,873,353 A | * | 2/1999 | Makita ........................ 123/538 |
| 5,947,091 A | | 9/1999 | Krohn et al. |

* cited by examiner

Primary Examiner—Marguerite McMahon
(74) Attorney, Agent, or Firm—McHale & Slavin, P.A.

(57) ABSTRACT

The present invention provides a parallel vaporized fuel system as well as a fuel vaporization apparatus for an internal combustion engine. More specifically, when the parallel vaporized fuel system is applied to vehicles, vaporized fuel is provided for general driving and liquid fuel is supplied as needed for immediate and heavy acceleration. The liquid fuel is generally gasoline, methanol or ethanol wherein the fuel vaporizes at a temperature of 425° F. or less. Fuel is delivered to the engine using the liquid fuel system until an adequate amount of vaporized fuel can be produced for operation of the engine. As vaporized fuel is produced liquid fuel being delivered to the engine proportionately reduced. Thereafter liquid fuel can be supplied to the engine when needed to compensate for the delay in vaporizing liquid fuel. This system can thereby provide improved fuel economy and reduced emissions over vehicles operating entirely from liquid fuel. The system can also provide immediate throttle response that vapor only systems can not provide without maintaining an excessive amount of vaporized fuel. This system also offers improved safety by not allowing fuel vapor and fresh air to mix prior to reaching the intake manifold of the engine

12 Claims, 2 Drawing Sheets

PARALLEL VAPORIZED FUEL SYSTEM

FIELD OF THE INVENTION

This invention relates to a parallel vapor/liquid fuel system and a fuel vaporization apparatus for an internal combustion engine. More specifically, when the parallel vaporized fuel system is applied to vehicles, vaporized fuel is provided for general driving and liquid fuel is supplied as needed for immediate and heavy acceleration. In this manner the parallel vaporized fuel system provides the improved efficiency of a vapor fuel system and the throttle response of a liquid fuel system without the need to store large quantities of vaporized fuel.

BACKGROUND OF THE INVENTION

Since the invention of the gasoline engine various attempts aimed at improving the efficiency of fuel systems have been made. It is well known in the prior art to provide fuel in a liquid form to a moving air stream for delivery to an internal combustion engine.

Carburetors were once standard for internal combustion engines. Carburetors use atomizing nozzles or jets which at least partially atomize the liquid fuel supplied to the engine. The nozzles aim the fuel at the throat of a venturi which, due to the sudden drop of pressure in the venturi, causes the droplets to break into small particles of liquid fuel. The small droplets of liquid fuel are then drawn into the cylinders of the engine for combustion.

Fuel injection is the current standard for supplying liquid fuel to gasoline engines. Electrical pulses provided by the on board computer cause the injectors to force liquid fuel through a nozzle. The nozzle breaks up the liquid fuel into small droplets. Some injectors aim their spray at a venturi for further atomization, others directly inject their spray into the intake manifold or combustion chamber.

While fuel injectors are generally capable of atomizing liquid fuel better than a carburetor, they still create small droplets of fuel. Small droplets of fuel do not burn completely and unburned fuel is discharged into the atmosphere as a pollutant.

Devices of the prior art have attempted to overcome the problems discussed above by increasing the vaporization of the liquid fuel. Increased vaporization can be accomplished in a number of ways, including various mechanical means such as screens. Other devices use heat to vaporize the fuel. The prior art contains a substantial number of suggestions directed to vaporizing liquid fuels with heat for use in an internal combustion engine. These solutions have generally centered around using the exhaust gases of the engine as a source of heat for accomplishing vaporization.

When compared to an engine operating from liquid fuel, an engine operating on vaporized fuel offers increased fuel economy and lower emissions. To get maximum economy, the prior art generally concentrates on operating an engine entirely on a vaporized liquid fuel such as gasoline or methanol. However, there is an unavoidable delay associated with vaporizing a liquid fuel, a delay that can cause problems when immediate throttle response is required. Numerous situations occur when operating a vehicle that require an immediate response time, e.g., heavy acceleration. While these situations only account for a small amount of total driving time, the delay associated with vaporizing a liquid fuel requires vaporization systems to be overbuilt or maintain a relatively large reserve supply of fuel vapor for acceptable operation. Overbuilt systems rely on excessive heat or large vaporizing apparatus to reduce response times. Reserve supplies of vaporized gasoline mixed with air are extremely volatile and may result in dangerous explosions.

A further problem associated with the overbuilt systems that has not been adequately addressed by the prior art involves the recognition that gasoline can be expected to completely vaporize at temperatures above about 425° F. The temperature of exhaust gases can be substantially higher than this value. Overheating of the fuel may result in fractionation of the fuel which causes the formation of undesired gums and tars.

Accordingly, a cost effective and parallel vaporized fuel system capable of providing the economical and emission reduction benefits of a vapor fuel system and the throttle response of a liquid fuel system that can be easily installed on new as well as existing engines with minimal modification of the original fuel system would satisfy a long felt need in the art.

DESCRIPTION OF THE PRIOR ART

A number of prior art systems exist for vaporizing liquid fuel. Most of the systems utilize hot exhaust gases or electrical elements to vaporize the fuel while others use a combination of both exhaust and electrical elements.

U.S. Pat. No. 5,947,091 to Krohn et al. discloses a fuel injector having an internally mounted heating element. The device is aimed at reducing emissions during cold engine start and warm-up phases. During these phases fuel is vaporized or partially vaporized as it passes through the injector and directly into the combustion chamber. The patent also discloses the possibility of continuous operation by directing hot exhaust gases through an optional gas channel that surrounds the body of the injector. Fuel is vaporized only during low fuel flow, during high fuel flow the fuel is only partially vaporized or heated before entering the combustion chamber. The patent fails to teach or suggest a parallel fuel system; the phase of the fuel entering the combustion chamber is dependent on the quantity of fluid flowing through the device.

U.S. Pat. No. 4,926,831 to Earl discloses a fuel vaporization apparatus in which fuel is vaporized before it enters the internal combustion engine by being fed through two combination vaporization chamber/exhaust manifolds through which engine exhaust passes. The device is aimed at providing vaporized fuel for normal and heavy acceleration. A single heat exchange plate separates the vaporization chamber and the exhaust manifold. An electric fuel pump provides liquid fuel to foggers that spray fuel into the vapor chambers. An air pump provides air to the vapor chambers so that upon depression of the accelerator pedal the vaporized fuel will flow through the carburetor of the engine. The engine is started on liquid fuel, but after the vaporizing chamber reaches a preset temperature the liquid fuel system is shut off from the fuel supply rendering it incapable of parallel operation as contemplated by the instant invention.

U.S. Pat. Nos. 4,538,583, 4,622,944, and 4,665,879 also to Earl disclose fuel vaporization apparatus in which the fuel vaporizes before it enters the internal combustion engine. The engine is started on liquid fuel, but after the vaporizing chamber reaches a preset temperature the liquid fuel system is shut off from the fuel supply rendering it incapable of parallel operation. After the vapor chamber reaches the desired temperature liquid fuel is fed through various amounts and configurations of heat conductive tubing, which is exposed to hot exhaust fumes and electrical heating elements. This design also fails to control the temperature of the apparatus and must maintain reserve vapors for peak demands. Due to the location of the fuel vapors an engine backfire could result in a serious explosion.

U.S. Pat. No. 4,606,319 to Silva discloses a dual fuel apparatus that operates entirely from vaporized fuel. The engine is started on a primary fuel such as methane, hydrogen, natural gas, propane, butane or acetylene. When the exhaust reaches an adequate temperature gasoline is allowed to flow into a vaporization apparatus. The primary fuel mixes with the vaporized gasoline and used to pushes the mixed fuel vapors to the carburetor. This configuration would require significant modification to install the system on a vehicle that is currently equipped with a liquid fuel system. No parallel liquid fuel system is suggested or disclosed.

U.S. Pat. No. 4,161,931 to Giardini et al. discloses an exhaust gas heat exchanger for vaporizing liquid fuel. The engine is started using vaporized fuel stored in an accumulator and thereafter uses the exhaust manifold to vaporize liquid fuel. The exhaust manifold consists of two generally parallel chambers and a diverter valve. Within one of the chambers is a length of spirally wound heat conductive tubing. Liquid fuel is allowed to flow through the tube while the diverter valve controls the temperature within the tube-containing chamber. Vaporized fuel is stored in an accumulator before being supplied to the engine. This device recognizes that the temperature of the heat exchanger needs to be regulated. However, this system requires the use of complex servomechanisms and sensors. Due to its complexity this device is not well suited for retrofitting on existing vehicles with gasoline engines. The configuration also requires a reserve supply of fuel vapor for peak demands increasing the risk of explosion. The patent makes no suggestion or disclosure of a parallel liquid fuel delivery system.

U.S. Pat. No. 4,550,706 to Hoffman discloses a liquid fuel vaporization device. The device utilizes a plurality of elongated electrical elements mounted within the main air stream entering the engine. During warm-up or acceleration a thermostatically or mechanically controlled valve allows an air pump to deliver a pre-vaporized mixture of air and fuel into the venturi. After warm-up liquid fuel is sprayed into the entering air stream and vacuum from the engine draws the air/fuel mixture across the heated elements as it enters the engine. This configuration holds a substantial amount of fuel vapor and air in an elongated air intake. The patent makes no suggestion or disclosure of a parallel liquid fuel delivery system.

U.S. Pat. No. 4,151,821 to Witchman, deceased et al. discloses an engine fuel system in which gas is vaporized in an atomization chamber prior to being fed into the internal combustion engine. During start-up an alternative gaseous fuel is used until the atomization chamber reaches a sufficient temperature to vaporize gasoline. After warm-up liquid fuel is sprayed by way of jet nozzles against a metal plate which is heated by exhaust gases. The vaporized gasoline is then supplied to a carburetor. The patent makes no suggestion or disclosure of a parallel liquid fuel delivery system.

The prior art devices fail to teach or suggest the use of a system capable of vaporizing a liquid fuel to be used substantially as a primary fuel in combination with a secondary liquid fuel system to supply fuel needed for immediate or heavy acceleration. The references are further deficient in teaching a vapor/liquid fuel system that can be easily installed on new as well as existing engines with minimal modification of the original fuel system.

SUMMARY OF THE INVENTION

The present invention provides a parallel vaporized/liquid fuel system as well as a fuel vaporization apparatus for an internal combustion engine. More specifically, when the parallel vaporized fuel system is applied to vehicles, vaporized fuel is provided for general driving and liquid fuel is supplied as needed for immediate and heavy acceleration. The liquid fuel is generally hydrocarbon fuel such as gasoline, methanol or ethanol which vaporizes at a temperature of about 425° F. or less. Fuel is delivered to the engine using the liquid fuel system, e.g. fuel injection or carburetor, until an adequate amount of vaporized fuel can be produced for operation of the engine. As vaporized fuel is produced, liquid fuel being delivered to the engine proportionately reduced. Thereafter, liquid fuel can be supplied to the engine only when needed.

In operation, the vehicle is started using its conventional liquid fuel system. After the engine is started an electric control module communicates with the vaporizing apparatus and the vehicles on-board computer. The control module monitors the internal temperature of the vaporizing canister with a sensor. If the temperature is too low to vaporize fuel the electric module allows electric current to flow through heating means for raising the temperature therein, e.g. from the battery to glow plugs mounted within the vapor canister. When the electric module determines that the vaporizing chamber has reached the desired temperature the module operatively controls at least one fuel injector to spray liquid fuel into the vaporization chamber. A small amount of exhaust is allowed to flow into the exhaust inlet of the chamber and push the vaporized fuel out of the vapor chamber for delivery to the engine. In addition to reducing NOx emissions from the engine this method prevents fresh air from being mixed with fuel vapor before it reaches the engine to reduce the possibility of explosion. As the fuel reaches the combustion chamber the vehicles on board sensors reduce the flow of liquid fuel being injected into the engine and the engine operates primarily using vaporized fuel. Should the engine need additional fuel for heavy acceleration the liquid fuel system can immediately provide liquid fuel until an adequate amount of vaporized fuel can be provided to the engine. This system can thereby provide improved fuel economy and reduced emissions over vehicles operating entirely from liquid fuel. The system can also provide immediate throttle response that vapor only systems can not provide without maintaining a relatively large amount of reserve vaporized fuel. This system also offers improved safety by not allowing fuel vapor and fresh air to mix prior to reaching the intake manifold of the engine.

Accordingly, it is an objective of the present invention to provide a fuel system capable of providing a combination of vaporized and liquid fuel based on engine demands.

It is a further objective of the present invention to provide a fuel system capable of providing a combination of vaporized and liquid fuel based on engine demands that requires minimal modifications to the factory fuel system.

It is a further objective of the present invention to provide a fuel system capable of providing a combination of vaporized and liquid fuel based on engine demands that eliminates the need to store excessive amounts of vaporized fuel.

It is a further objective of the present invention to provide a fuel system capable of providing a combination of vaporized and liquid fuel based on engine demands that does not allow fuel vapors to mix with fresh air prior to reaching the intake manifold of the engine.

It is another objective of the present invention to provide a fuel system capable of providing a combination of vaporized and liquid fuel based on engine demands that can be installed on existing as well as new vehicles.

It is another objective of the present invention to provide a kit for a fuel system capable of providing a combination of vaporized and liquid fuel based on engine demands which is simple to install and which is ideally suited for original equipment and aftermarket installations.

It is yet another objective of the present invention to provide a kit for a fuel system capable of providing a combination of vaporized and liquid fuel based on engine demands that can be inexpensively manufactured and which is simple and reliable in operation.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
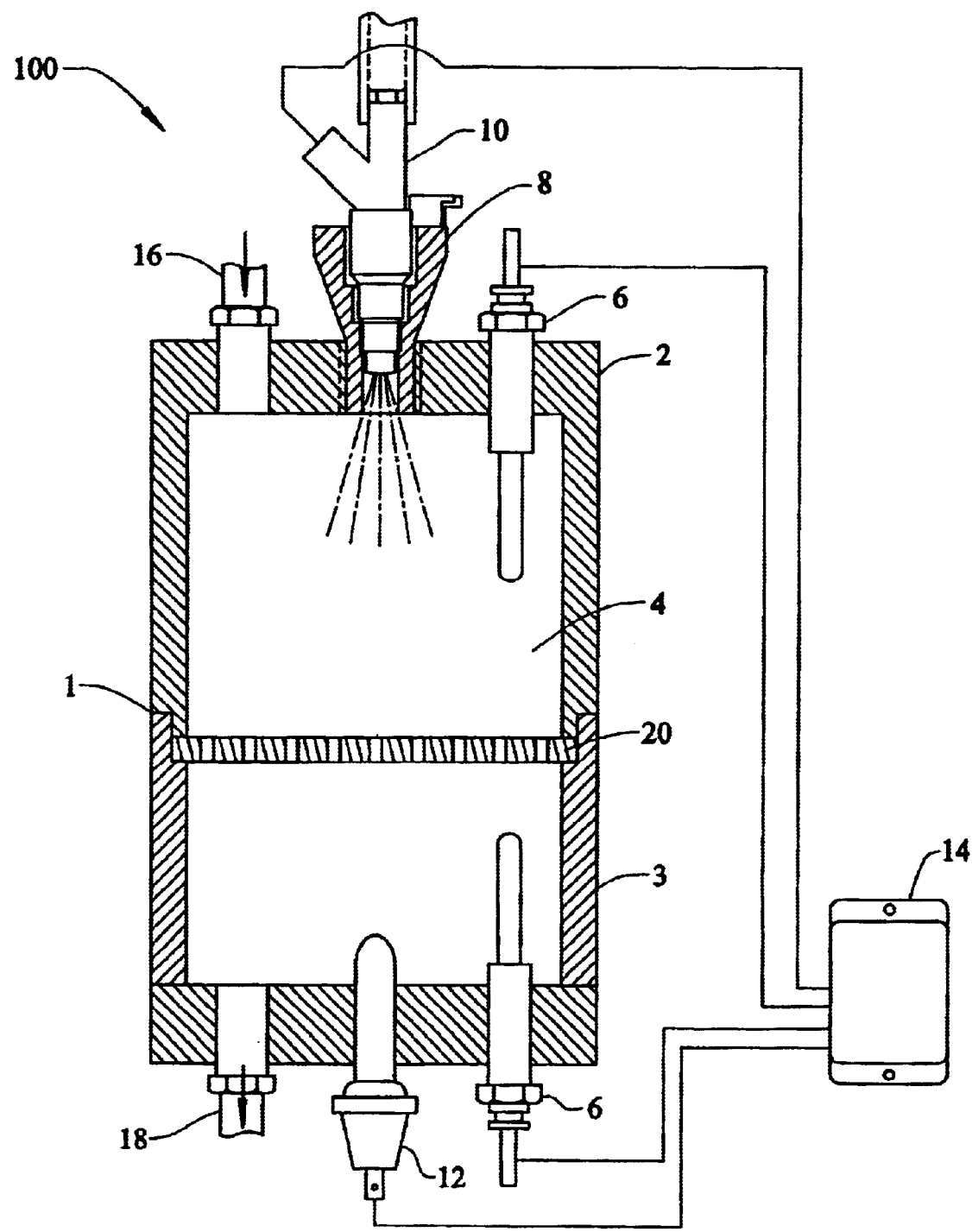
FIG. 1 is a section view illustrating the vapor chamber of the present invention.
Figure 2:
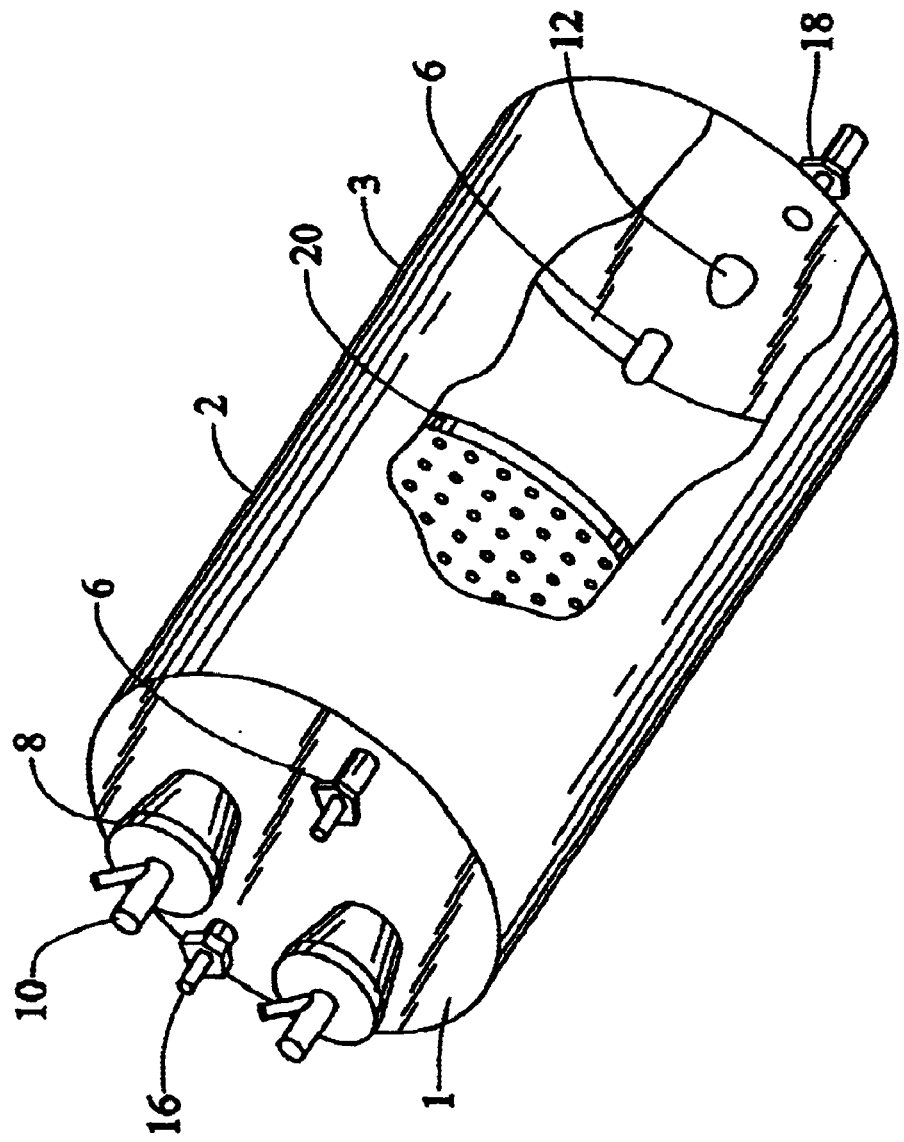
FIG. 2 is a perspective view of the present invention a portion thereof being broken away.

In order to alleviate the problems associated with operating an internal combustion engine entirely from vaporized liquid fuel, the present invention utilizes a parallel vaporized fuel system 100 as set forth in FIG. 1.

In accordance with FIG. 1 a preferred embodiment is illustrated containing a fuel vaporizer canister 1 comprised of two mating halves. The top half 2 constructed with a first closed end and the bottom half 3 having a second closed end. The top half 2 and the bottom half 3 are joined to form a sealed enclosure surrounding interior chamber 4. In the preferred embodiment the volume of interior chamber 4 is approximately 20 cubic inches. Vaporizing canister 1 is preferably constructed of aluminum but may be constructed of other suitable materials well-known in the art which are capable of withstanding contact with fuel and capable of adequate heat resistance. Removably mounted in the first and second ends of canister 1 is a fuel heating means, illustrated as at least one electric glow plug 6 for heating the interior chamber 4 of the canister 1. At least one and preferably two universal fuel injector adapters 8 are constructed and arranged for removable attachment to the first end of top half 2 of canister 1. Each universal fuel injector adaptor 8 is constructed having a plurality of centrally located bores arranged for removably attaching and locating a fuel injector 10. In the preferred embodiment the fuel injector adaptors are made of aluminum but may be constructed of other suitable materials well known in the art which are capable of withstanding contact with fuel and capable of adequate heat resistance. The fuel injector(s) 10 should be capable of modulating an adequate amount of fuel to the vaporizing chamber for efficient operation of the engine. Also removably mounted in the canister 1 is a sensor 12 for monitoring the temperature of interior chamber 4. The temperature sensor 12 should be capable of communication with the control module 14. The control module 14 is capable of operational control of the glow plug(s) 6 based on communication from temperature sensor 12 to maintain the desired temperature within the chamber 4. The control module 14 is also capable of communicating with the vehicles on board computer. The on board computer utilizes various sensors to monitor the engines operating parameters. The parameters are communicated to the control module for operational control of the fuel injector(s) 10. Also provided in the first end of the top half 2 of vapor canister 1 is a vapor outlet 18 in fluid communication with the intake air of an internal combustion engine; in the second end of the bottom half 3 of canister 1 is exhaust gas inlet 16 in fluid communication with exhaust gas from the engine. During operation a small amount of exhaust gas is allowed to flow into the exhaust gas inlet 16 thereby forcing vaporized fuel mixed with the exhaust gas out of the fuel vapor outlet 18 to the engine.

In operation, the vehicle is started using its conventional liquid fuel delivery system, e.g. carburetor or fuel injection. After the engine is started the electric module 14 communicates with the vaporizing canister 1 and the vehicles on-board computer. The control module 14 monitors the internal temperature of the vaporizing canister 1 with a temperature sensor 12. If the temperature is too low to vaporize fuel the control module 14 allows electric current from the battery to flow through the glow plugs 6 raising the temperature of the vaporizing chamber 4. When the control module 14 determines that the vaporizing chamber 4 has reached the desired temperature the control module 14 operatively controls at least one fuel injector 10 to spray liquid fuel into the vaporization chamber 4. A small amount of exhaust is allowed to flow into the exhaust inlet 16 of the vapor chamber 4 and push the vaporized fuel out of the vapor chamber 4 for delivery to the engine. As the vaporized fuel reaches the combustion chamber the vehicles on board sensors proportionately reduce the flow of liquid fuel being injected into the engine and the engine operates primarily using vaporized fuel. Should the engine need additional fuel for heavy acceleration the liquid fuel system, e.g. carburetor or fuel injection, can provide an immediate response. As the vapor chamber 4 is able to produce more vaporized fuel in response to the increased requirement liquid fuel supplied to the engine is proportionately reduced.

In an alternative embodiment a magnetic perforated plate 20 may be positioned within chamber 4 to polarize the vaporized fuel prior to its exiting of the chamber 4. In the preferred embodiment the magnetic plate is a permanent magnet. Alternatively the magnet may be an electro magnet.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A parallel vapor/liquid fuel system for use with an internal combustion engine for providing fuel to said engine as a vapor and/or as a liquid based on engine demands, comprising:

a fuel source which exists in a liquid state at normal atmospheric pressure and temperature;

fuel delivery means constructed and arranged to deliver fuel from said fuel source to a means for supplying liquid fuel and to a means for supplying vaporized fuel, said means for fuel delivery in fluid communication with said fuel source;

a means for supplying liquid fuel to said engine, said means for supplying liquid fuel in fluid communication with said fuel source;

a means for supplying vaporized fuel to said engine, said means for supplying vaporized fuel in fluid communication with said fuel source, said means for supplying vaporized fuel to said engine including at least one canister, said at least one canister having an internal vaporizing chamber, an exhaust gas inlet and a fuel vapor outlet;

at least one heating means for supplying heat to said vaporizing chamber, said heating means being removably attached to said canister, said heating means being in electrical communication and operatively controlled with a fuel vaporization control means;

at least one sensor for monitoring temperature within said vaporizing chamber, said sensor being removably attached to said canister, said sensor being in electrical communication with said fuel vaporization control means;

at least one fuel modulating means for controlling liquid fuel admitted into said vaporizing chamber, said fuel modulating means constructed and arranged for removable attachment to said canister, said fuel modulating means in electrical communication and operatively controlled by said fuel vaporization control means;

an on-board computer for monitoring vapor/liquid fuel requirements as a function of engine demand, said on-board computer in operational control of said means for supplying vapor/liquid fuel; and fuel vaporization control means in electrical communication with said computer for controlling supply of vaporized fuel.

2. The parallel vapor/liquid fuel system as set forth in claim 1, wherein said fuel modulating means for controlling liquid fuel admitted into said vaporizing chamber comprises at least one fuel injector, said fuel injector in electrical communication and operatively controlled with said fuel vaporization control means.

3. The parallel vapor/liquid fuel system as set forth in claim 1, wherein said heating means for supplying heat to said vaporizing chamber comprises at least on electrical glow plug, said electrical glow plug in electrical communication with said fuel vaporization control means.

4. The parallel vapor/liquid fuel system as set forth in claim 1, wherein said canister further comprises a magnetic means for polarizing said vaporized fuel.

5. The parallel vapor/liquid fuel system as set forth in claim 4 wherein said magnetic means for polarizing said vaporized fuel comprises a perforated permanent magnetic plate.

6. The parallel vapor/liquid fuel system as set forth in claim 1, wherein said means for supplying liquid fuel to said engine comprises a carburetor, said carburetor in electrical communication with said on-board computer.

7. The parallel vapor/liquid fuel system as set forth in claim 1, wherein said means for supplying liquid fuel to said engine comprises a fuel injection system, said fuel injection system in electrical communication with said on-board computer.

8. A parallel vapor/liquid fuel system kit for use with an internal combustion engine, said engine having a liquid fuel system, wherein said fuel system kit allows fuel to be supplied as a vapor and/or as a liquid based on engine demands, comprising:

a fuel source which exists in a liquid state at normal atmospheric pressure and temperature;

fuel delivery means constructed and arranged to deliver fuel from said fuel source to said means for supplying vaporized fuel, said means for fuel delivery in fluid communication with said fuel source;

a means for supplying vaporized fuel to said engine, said means for supplying vaporized fuel in fluid communication with said fuel source, said means for supplying vaporized fuel including at least one canister, said canister having an internal vaporizing chamber, an exhaust gas inlet and a fuel vapor outlet;

at least one heating means for supplying heat to said vaporizing chamber, said heating means being removably attached to said canister, said heating means being in electrical communication and operatively controlled by a fuel vaporization control means;

at least one sensor for monitoring temperature within said vaporizing chamber, said sensor in electrical communication with said fuel vaporization control means;

at least one fuel modulating means for controlling liquid fuel admitted into said vaporizing chamber, said fuel modulating means constructed and arranged for removable attachment to said canister, said fuel modulating means in electrical communication and operatively controlled by said fuel vaporization control means;

an on-board computer for monitoring vapor/liquid fuel requirements as a function of engine demand, said on-board computer in operational control of said means for supplying vapor/liquid fuel; and fuel vaporization control means in electrical communication with said computer for controlling supply of vaporized fuel.

9. The parallel vapor/liquid fuel system kit as set forth in claim 8, wherein said fuel modulating means for controlling liquid fuel admitted into said vaporizing chamber comprises at least one fuel injector, said fuel injector in electrical communication and operatively controlled with said fuel vaporization control means.

10. The parallel vapor/liquid fuel system kit as set forth in claim 8, wherein said heating means for supplying heat to said vaporizing chamber further comprises at least one electrical glow plug, said electrical glow plug in electrical communication and operatively controlled with said fuel vaporization control means.

11. The parallel vapor/liquid fuel system kit as set forth in claim 8, wherein said canister further comprises a magnetic means for polarizing said vaporized fuel.

12. The parallel vapor/liquid fuel system kit as set forth in claim 11, wherein said magnetic means for polarizing said vaporized fuel comprises a perforated permanent magnetic plate.

* * * * *